July 22, 1969

J. W. BAUM 3,457,413

DOSE EQUIVALENT RADIATION SYSTEM

Filed May 31, 1967

INVENTOR.
JOHN W. BAUM
BY

July 22, 1969   J. W. BAUM   3,457,413
DOSE EQUIVALENT RADIATION SYSTEM
Filed May 31, 1967   4 Sheets-Sheet 2

SMALL SIGNAL GAIN $= \dfrac{Z_f}{Z_{in}} \approx \dfrac{100K}{100K} = 1$

LARGE SIGNAL GAIN $= \dfrac{Z_f}{Z_{in}} \approx \dfrac{100K}{10K} = 10$

INVENTOR.
JOHN W. BAUM
BY

July 22, 1969   J. W. BAUM   3,457,413
DOSE EQUIVALENT RADIATION SYSTEM
Filed May 31, 1967   4 Sheets-Sheet 4

INVENTOR.
JOHN W. BAUM
BY

United States Patent Office 3,457,413
Patented July 22, 1969

3,457,413
DOSE EQUIVALENT RADIATION SYSTEM
John W. Baum, Patchogue, N.Y., assignor to the United States of America as represented by the United States Atomic Energy Commission
Filed May 31, 1967, Ser. No. 643,318
Int. Cl. G01t 1/18
U.S. Cl. 250—83.6                                    4 Claims

ABSTRACT OF THE DISCLOSURE

A radiation survey system with readout in rem for monitoring radiation fields with mixed component particle and photon radiation with individual component linear energy transfer values ranging from 0.2 kev./$\mu$m. of tissue, to about 200 kev./$\mu$m. of tissue, having a spherical tissue-equivalent proportional counter detector with gas filling for providing a pulse output, and amplifier means for providing a readout proportional to the number of pulses and the sum of their heights wherein the larger pulses include a factor for the proportional increase in biological effectiveness of high linear energy transfer values.

BACKGROUND OF THE INVENTION

This invention relates to apparatus and method for measuring mixed radiation fields around nuclear reactors and accelerators, and more particularly to the detection and measurement of mixed radiation fields of particles and photons around accelerators. This invention was made under or in connection with a contract with the U.S. Atomic Energy Commission.

In the case of high energy accelerators the radiation field mixture becomes very complex since it includes not only photons, electrons, and neutrons, but also protons and one or more of over 100 other particles and antiparticles, discussed for example in report BNL–888 (T–360), dated January 1965. Each of these particles can have an energy from some maximum determined by the energy of the machine, e.g., 33 GeV for the BNL alternating gradient synchroton, to zero. Thus, the number, energy spread, and type of interactions produced by these particles is very large. It is universally recognized, therefore, that a simple, effective, dose equivalent radiation field survey system for these mixed radiation fields is desired.

It is an object of this invention to provide an economical and practical apparatus and method for the detection, measurement and analysis of mixed radiation fields of a broad band of energies by providing a tissue-equivalent spherical proportional counter and amplified pulses therefrom that represent rem dose;

It is a further object to employ a portable detector and a converter for transforming the output pulses therefrom to pulse trains that can be counted or passed through a count-rate-meter;

A further object is to provide a wide dynamic range operational amplifier output that corresponds to the pulse height spectra from an ionization chamber that is exposed to fields of radiation containing particles of both single and mixed linear energy transfer along the track of the particles, hereinafter referred to as LET, so as to measure dose from particles having LET from 0.2 kev./$\mu$m. of tissue to about 200 kev./$\mu$m. of tissue.

SUMMARY OF THE INVENTION

The foregoing objects are achieved by employing a tissue-equivalent proportional counter and amplifying the pulses therefrom with an operational amplifier that converts the detector output into a pulse spectrum that is weighed for quality factor to represent roentgen equivalent man (rem). With the proper selection of proportional counter, and amplifier gain, as described in more detail hereinafter, the desired detection, measurement and analysis is achieved.

The above and further objects and novel features of the invention will appear more fully from the following detailed description when the same is read in connection with the accompanying drawings. It is understood, however, that the drawings are not intended as a definition of the invention but are for the purpose of illustration only.

BRIEF DESCRIPTION OF THE DRAWING

In the drawings where like elements are marked alike.

DESCRIPTION OF THE PREFERRED EMBODIMENT

Figure 1:
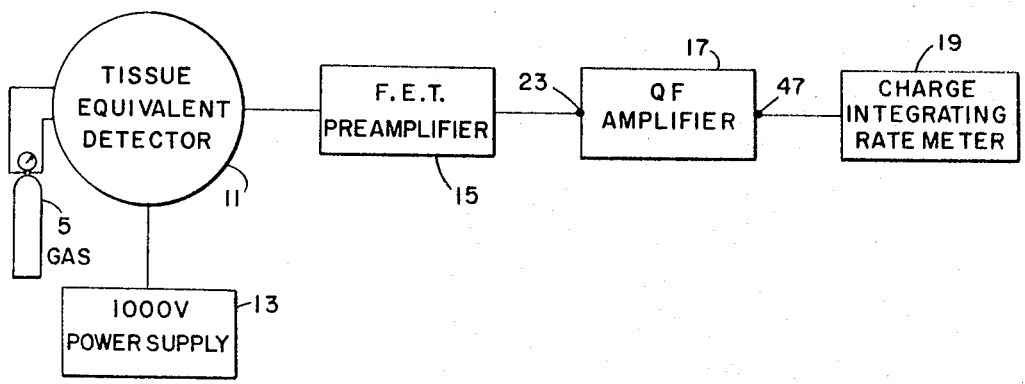
FIGURE 1 is a partial schematic drawing of the elements of this invention.

Referring now to FIGURE 1, the principal components of this invention comprise a tissue equivalent proportional counter 11 having a power supply 13, an FET preamplifier 15, a QF amplifier 17, and a charge integrating rate meter 19.

Advantageously, the detector 11 is a four-inch diameter Rossi-type spherical tissue equivalent proportional counter filled to about 20 mm. Hg pressure with tissue equivalent gas containing 32% $CO_2$, 65% $CH_4$, and 3% $N_2$. One suitable detector is discussed by Rossi and Rosenzweig in Radiation Research 2, 417–25 (1955), and Report NYO 4523 by Failla and Rossi. The detector 11 is advantageously molded using a Shonka-type tissue equivalent plastic. One such plastic is described by Shonki, Rose and Failla in "Conducting Plastic Equivalent to Tissue, Air and Polystyrene," published in the Proceedings 2nd Intern. Conf. on Peaceful Uses of Atomic Energy 21, Geneva, 1958.

Advantageously, the sphere diameter of detector 11 and the gas pressure therein are small enough to provide a triangular pulse height spectrum for single LET radiations and large enough to produce pulses detectable by the counter. Low energy high LET events are a small traction of the total event fraction, and increased gas pressure reduces the size of some pulses and increases the size of others. Thus, a suitable gas pressure is about 20 mm. of Hg and a suitable detector sphere diameter is about four inches. Advantageously, a continuous gas flow system 5 is provided continuously to circulate gas through the detector 11.

In this detector 11, a particle passes through the gas to produce ions and electrons therein. These electrons produce secondary electrons in an avalanche and the primary and secondary electrons are collected at the collecting electrode by providing a high collecting potential from power supply 13. This produces an output pulse from detector 11 proportional to the energy deposited in the gas by the particle.

The practical dosimeter system 21, in accordance with this invention, applies to the output pulses from this detector 11, the quality factor (OF) linear energy transfer (LET) relationship defined by the National Committee on Radiation Protection (NCRP), in "Permissible Dose From External Sources of Ionizing Radiation," NBS Handbook 59, September 1954, and the "Recommendations of the International Commission on Radiological Protection," ICRP Publication 4, "Report of Committee IV on Protection Against Electromagnetic Radiation Above 3 mev. and Electrons, Neutrons and Protons," Peramon Press, 1964. To this end the pulses from detector 11 pass through a low noise field effect transistor (FET) preamplifier 15, are amplified further by a nonlinear (QF) amplifier 17 having provision for further nonlinear amplification that weighs the pulses in a manner that provides greater amplification for large pulses, which in general are due to high LET events. Thus, the output of the nonlinear or quality factor amplifier 17 is a pulse whose amplitude is, on the average, proportional to dose equivalent in rems. A summing circuit integrating rate meter 19 both counts the latter pulse and weighs it for size. The output of the integrating rate meter 19 is thus proportional to both the number of pulses and the sum of their heights. Actual tests, using an analog-to-digital converter and scalers, have confirmed the operability of the summing count rate meter in the system of this invention.

Figure 2:
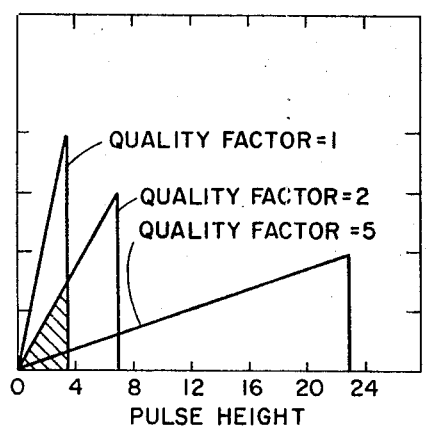
FIGURE 2 is a graphic illustration of the pulse spectra from single LET radiations.

Since the pulse height spectrum from detector 11 is triangular for single LET radiations, it is possible to provide an amplifier gain curve that transforms the detector output pulse spectrum into a new pulse height spectrum that contains quality factor amplification or weighing. Considering the spectrum shown in FIG. 2, labeled $QF=1$, all the pulses from this spectrum should be amplified by some value, say one. Next, consider the spectrum of pulses from a $QF=2$ radiation. These pulses should all be amplified by two. However, since some pulses fall in the region that has been reserved for gain one (hatched area in FIG. 2), it is necessary to amplify the remainder of the spectrum by a number somewhat greater than two so that the average gain for the entire spectrum equals two.

The actual number to be used can be determined by considering the relative number of events in the two regions with this number proportional to the area under the number vs. height curve in each region. The result in one embodiment is a gain requirement 2.33 for the portion of the quality factor=2 spectrum which falls between 3.5 and 7 pulse height units.

Figure 3:
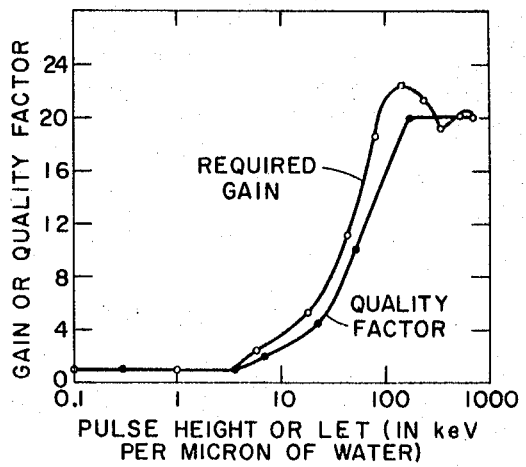
FIGURE 3 is a graphic illustration of one embodiment of the required gain vs. pulse height of charged particles traversing the detector of FIG. 1.

Similar reasoning applied to the quality factor=5 spectrum in this embodiment requires consideration of three segments of the spectrum; one that has gain=1, one that has gain=2.33, and the remainder that must have a gain large enough to give an average gain of five for the entire spectrum. The result dictates a gain equal to 5.31 for the region of the spectrum from 7 to 23 pulse height units. Continuing this process for spectra caused by single LET radiations of 53, 100, 175, 275, 400, 600 and 800 kev./$\mu$ gave results as shown in FIGURE 3.

As will be understood in more detail hereinafter, it will be noted in connection with FIGURE 3, that between 3.5 and 300 kev./$\mu$, the required gain is greater than the corresponding quality factor. This is due to the fact that a fraction of every spectrum caused by radiations of LET greater than 3.5 kev./$\mu$ consists of small pulses that are treated electronically as if they were caused by a lower LET radiation. Above 300 kev./$\mu$ the gain curve oscillates about the quality factor curve. This is due to overcompensation for small pulses from a high LET spectrum.

Figure 4:
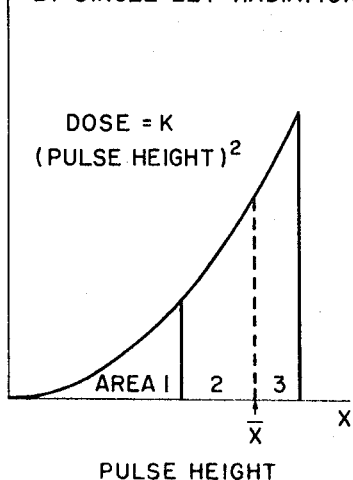
FIGURE 4 is a graphic illustration of the dose spectrum produced by single LET radiation.

The required gain calculated as described above was plotted at points which represent the average dose for the region of the pulse height spectrum considered. This average point was determined by utilizing the fact that the dose per unit pulse height interval varies as the square of the pulse height as shown on FIGURE 4. A portion of each spectrum, designated as area 1 on FIGURE 4, is excluded because its gain was dictated by lower quality factor spectra. The regions designated areas 2 and 3 were made equal by solving two integral equations with $\bar{x}$ in each. $\bar{x}$ was thus determined and represents the pulse height of average dose for the portion of the spectrum which includes areas 2 and 3 and for which a gain was calculated. For example, the required gain for the right hand portion of the quality factor equals two spectrum was 2.33 and included pulse heights from 3.5 to 7 pulse height units. The 2.33 gain point was plotted at $\bar{x}$ equals 5.78 pulse height units. This results in this embodiment in a gain of less than 2.33 for the portion of the spectrum from 3.5 to 5.78 pulse height units and a gain of more than 2.33 for the portion of the spectrum from 5.78 to 7 pulse height units. The average gain for the region from 3.5 to 7 pulse height units is thus very close to the desired value of 2.33. Since the gain curve is a smoothly varing function, it is substantially correct to within a few percent even though only ten points were used in its generation in this embodiment.

In a later embodiment, in which the gain curve was developed by analyzing spectra produced by single LET radiations differing in LET by 14 percent, the fraction of the dose spectrum receiving too small a gain, $F_1$, is given by $$F_1 = \frac{\int_0^x Kx^2 dx}{\int_0^{1.14x} Kx^2 dx} = 0.676$$

The relationship which must apply for each spectrum of pulses is $$QF_n = F_1 \times QF_{n-1} + F_2 \times G_n$$

where $QF_n$ is the QF for spectrum $n$, $F_1$ is the fraction of the dose spectrum which receives too small a gain, $QF_{n-1}$ is the QF for that portion of the spectrum and $F_2$ is the fraction of the dose spectrum receiving gain $G_n$. Since $$F_2 = 1 - F_1 \tag{3}$$

it follows that $$G_n = \frac{QF_n - 0.67 QF_{n-1}}{0.324} \tag{4}$$

The required gain calculated as described above is plotted on FIG. 9 at points which represent the average dose for the region ($F_2$) of the pulse height spectrum considered. This average point was again determined by considering that the dose per unit pulse height interval varies as the square of the pulse height as shown on FIG. 4. A portion of each spectrum, designated as area 1 on FIG. 4, is excluded because its gain was directed by lower quality factor spectra. The areas of the region designated 2 and 3 were made equal by solving two integral equations with $\bar{x}$ in each as follows:

$$\int_x^{\bar{x}} Kx^2 dx = \int_{\bar{x}}^{1.14x} Kx^2 dx \tag{5}$$

where $x$ is the largest pulse in the $n-1$ spectrum. Solving Equation 5 gives $x=1.075x$. Therefore, each calculated gain is plotted at $1.07x$.

Figure 9:
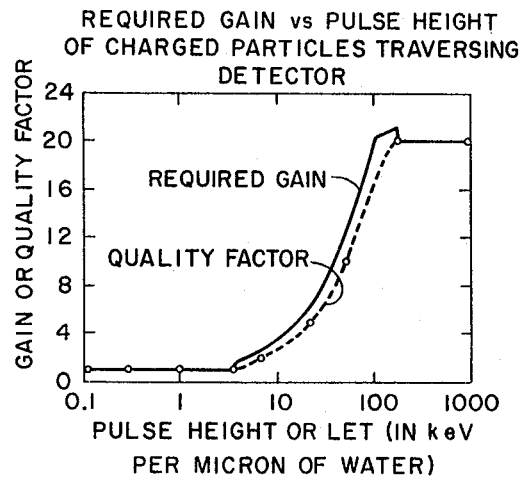
FIGURE 9 is a graphic illustration of another embodiment of the required gain vs. pulse height of charged particles traversing the detector of FIG. 1.
Figure 10:
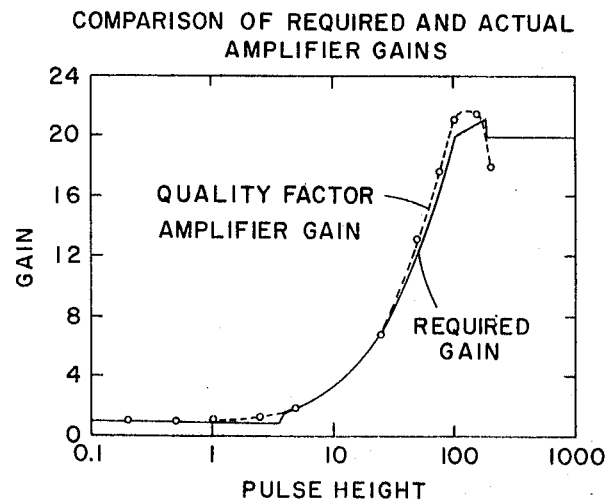
FIGURE 10 is a graphic illustration of the comparison of the required an actual amplifier gains for the system of the embodiment of FIG. 9.

As shown in FIG. 9, the required gain (normalized to one for values ≤3.5 kev./$\mu$ in this embodiment between LET values of 3.5 and 175 kev./$\mu$ is somewhat greater than the corresponding QF. Above and below these limits, required gain equals QF. FIG. 10 shows the required and actual amplifier gains in accordance with this embodiment.

In accordance with the system of both the curves of

FIGS. 3 and 9 a particle produces a pulse in detector 11 in a mixed radiation field having quality factors from 1 to 20, and these pulses are amplified by an amount that weighs the pulses according to their quality factor, the weighing being based on the output pulses produced by pure fields whose quality factors vary respectively from 1 to 20 in at least 10 equally spaced intervals, said amplification assigning gains to the spectra for each field from quality factors of 1 to 20 so that each gain after the first takes into account the gains assigned previously for lower quality factors. Advantageously 36 equally spaced intervals are employed.

Figure 5:
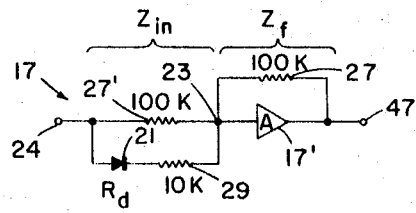
FIGURE 5 is a partial schematic illustration of the principles of the amplifier system of FIG. 1.

Referring now to FIGURE 5, which illustrates the principles of the amplifier 17 of this invention, a nonlinear operational amplifier 17, with larger gain for large pulses than for small pulses, receives an input or feedback at junction 23 from a diode 21 connected to peramplifier 15 at junction 24. The nonlinear characteristics of the diode 21 provide the desired input at junction 23 for the correct operational amplifier 17' output.

The gain of the operational amplifier 17' with its feedback is equal to the ratio of the feedback to input impedances or Gain=$Z_f/Z_{in}$. For small input voltages, e.g., mv., the impedance of diode 21 is large. Thus $Z_{in} \approx$ 100K for the embodiment shown in FIGURE 5, and gain at 10 mv. is $\approx$100K/100K=1. For large input voltages, e.g., 1 volt, the diode impedance is small and $Z_{in} \approx$ 10K. Gain at 1 volt is then $\approx$100K/10/=10.

As illustrated in FIG. 5, gain depends on values of all the components in the input and feedback circuits and in particular, on the ratio of the impedance presented by feedback resistor 27 and the signal at input 24. Also, the ratio of the gain at large voltages to that at small voltages is changed by merely changing the ratio of the two input impedances, such as with resistors 27' and 29. The shape of the gain curve can then be further modified by the addition of linear and nonlinear elements in the input and feedback circuits to provide the desired output from amplifier 17 at junction 47.

Figure 6:
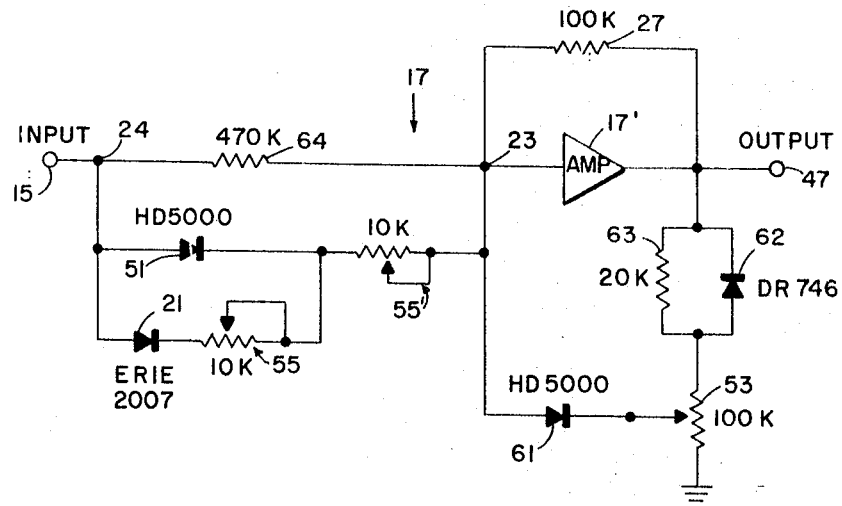
FIGURE 6 is a partial circuit diagram of the operational amplifier system of this invention shown in FIG. 1.

In a practical embodiment illustrated in FIG. 6, diodes 21 and 51 are high frequency silicon diodes having resistances varying from megohms to ohms as forward applied voltages vary from millivolts to about one volt. A 10K potentiometer 55 in series with diode 21 on the input side of the operational amplifier 17' serves as an adjustment for the small signal gain. One suitable diode 21 is an Erie brand 2007 diode. The 100K potentiometer 53 in the output circuit serves to provide gain adjustments for signals of medium amplitude. The second 10K potentiometer 55' in the input circuit adjusts the gain for large signals. Diodes 61 and 62 and resistor 63 complete the circuit on the outside of operational amplifier 17' and resistor 64 completes the input side thereof.

Figure 7:
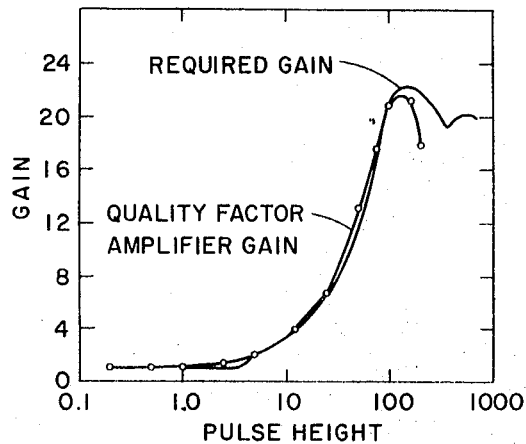
FIGURE 7 is a graphic illustration of the comparison of the required and actual amplifier gains for the system of FIG. 1.

The described elements in FIG. 6 for operational amplifier 17' approximate the desired response up to pulse sizes corresponding to about 150 kev./$\mu$. Typical responses are illustrated in FIGS. 7 and 10. Beyond this, the operational amplifier output begins to saturate and, therefore, gain drops rapidly.

The system of FIG. 6, excluding the operational amplifier 17', was tested over a temperature range of 45° F. to 104° F. Gamma sensitivity increased with temperature about 2.4%/° F. Neutron sensitivity increased about 0.8%/° F. Also, the operability of the system was confirmed by feeding pulses from an RIDL mercury pulser into the FET preamplifier 15 to produce a pulse shape at the output of the preamplifier that closely approximated the output produced by pulses obtained from an internal alpha-particle source in the detector 11.

Figure 8:
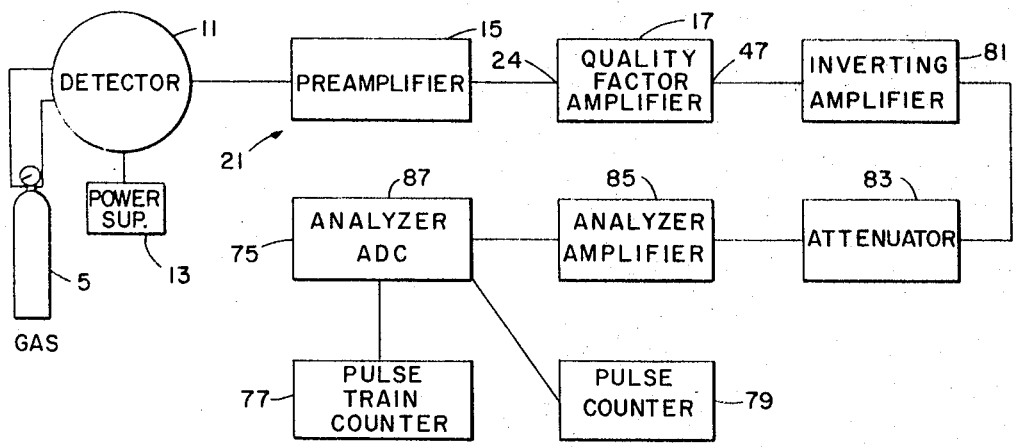
FIGURE 8 is a partial block diagram of a system for testing the system of FIG. 1.

According to the procedure for these tests, pulses from the quality factor amplifier 17 are summed for number and height with a multichannel analyzer 75 and two scalers 77 and 79, shown schematically in FIG. 8. The outputs of the quality factor amplifier 17 vary from about one millivolt for small pulses due to minimum ionizing particles to about 72 volts for the largest pulses due to particles with 200 kev./$\mu$ LET. Advantageously, therefore, the output pulses from amplifier 17 pass through an inverting amplifier 81, an attenuator 83 and an analyzer amplifier 85 before finally reaching the analyzer 75, comprising an analog-to-digital converter (ADC).

An oscillator in the ADC 75 is turned on for a length of time proportional to a constant plus a time proportional to the height of the pulse being analyzed. The constant time results in ten oscillations. The pulse being analyzed adds to this train a number of oscillations equal to the channel in which the information is stored. Thus a pulse, stored in one channel, for example channel 87, causes the ADC 75 to put out a train with 27 total oscillations.

In order to integrate the number and height of the output pulses from operational amplifier 17, the train of oscillations is counted in counter 77 shown in FIG. 8. For each summed train therein, a pulse also is sent to a second counter 79, which thus provides a number that is used to correct for the ten extra oscillations per train in the pulse train counter 77.

To cover the entire dynamic range, data for relative gains of 1, 32 and 1057 are taken using the inverting amplifier 81, an R-C attenuator network 83, and the gain of analyzer amplifier 75 as adjustments. Train counts obtained at the various gains are normalized by dividing the counts by the gain at which they are taken.

An additional correction of a few percent can be made to the count in the pulse train counter 77 to correct for trains caused by pulses larger than the analyzer capacity. For example, with a 100-channel analyzer 75, pulses larger than appropriate for channel 100 cause the ADC 75 to put out a pulse train with an average of about 120 oscillations. These are subtracted from the total count in the pulse train counter 77. The number of overflow pulses is estimated from the counts in the pulse counter at lower gain settings. Finally, background counts are processed at each gain and subtracted to give net counts from known sources.

Dose rates used in testing the system of this invention were 9.6 mrem/hr. from the neutron source and 4.1 mrads/hr. from the gamma source, but other values giving other calibrations can be used. No correction was made for the attenuation of the radiations in the wall of the detector 11 since the wall is advantageously only ¼" thick. To test the relative sensitivity and reproducibility of the results, a total of nine one-minute measurements of background, the neutron source, and the gamma source were made on five different days. The ratio of neutron/gamma sensitivity ranged from 0.86 to 1.26 with an average of 1.06. The fluctuations were attributed to rather infrequent high LET events, such as heavy ion recoils that produce output pulses $10^4$ to $10^5$ times that for minimum ionizing events.

In these tests, a collimated 5.8 mev. $Cm^{244}$ internal alpha source provided calibration pulses of known LET. A typical mean LET was 86 kev./$\mu$ of tissue, based on stopping power data, published in Proc. of the Cambridge Phil. Soc. 40, 95 (1944), and Phys. Rev. 1–8 (1950). The shape of the gain vs. pulse height was first adjusted using pulses from a RIDL mercury pulser. The high voltage on the detector 11 from source 13 was then adjusted to cause the alpha pulses to have an amplitude of about 1.9 v. at the input junction 24 for quality factor amplifier 17, giving about 37 v. at the output 47 of amplifier 17. This operation, as described above, was then repeated to measure the dose from a Pu–Be neutron source and a radium gamma source placed at one meter from the detector.

The invention provides a radiation survey method and apparatus for mixed component particle and photon radiation with individual component LET ranging from 0.2 kev./$\mu$m. of tissue to about 200 kev./$\mu$m. of tissue. The detector of this invention is particularly adapted for use around reactors and for accelerator facilities where the number, energy spread and type of interactions produced is high. This invention, moreover, is useful in simple, effective, and portable wide dynamic range detector and operational amplifier system.

While only a preferred electrical embodiments of the invention has been described, it is understood that the scope thereof is not limited thereto but is intended to be covered by the claims which follow.

What is claimed is:

1. In combination with a pulse producing proportional counter for detecting and measuring mixed radiation fields, an amplifier therefor having the required gain for converting the counter pulses into a pulse spectrum weighted for quality factor for particles having LET from 0.2 kev./$\mu$m. of tissue to about 200 kev./$\mu$m. of tissue, and means connected to said amplifier for providing a summing network for providing a readout proportional to the number of pulses from said amplifier and the sum of their amplitudes.

2. The invention of claim 1 having nonlinear amplifying elements for said amplifier, comprising diodes, and potentiometers for changing the ratio of gain at large voltages to that at small voltages by changing the ratio of the output and input impedances of said amplifier.

3. The invention of claim 1 having seriatim a low noise field effect transistor preamplifier means connected between said counter and amplifier, said amplifier, which is a nonlinear amplification means that weighs the pulses from said counter to provide greater amplification for larger pulses than smaller pulses, inverting amplification means, an attenuator, analyzer amplification means, and said means for providing said summing network, which comprises an analyzer having an analog-to-digital converter, and counters for integrating the number and height of the pulses from said nonlinear amplification means.

4. The invention of claim 3 in which the analyzer has an information oscillator that is turned on to produce an oscillation train for a length of time proportional to a constant plus a time proportional to the height of the pulse being analyzed therein, the pulse analyzed thereby being added to the oscillation train with the number of oscillations thereof being equal to a channel adapted to store the information thereof.

References Cited

UNITED STATES PATENTS

| | | | |
|---|---|---|---|
| 2,506,419 | 5/1950 | Graves | 250—83.6 X |
| 2,617,044 | 11/1952 | Neher | 250—83.6 |
| 2,968,726 | 1/1961 | Bersin et al. | 250—83.6 X |
| 2,974,248 | 3/1961 | Auxier et al. | 250—83.6 X |

ARCHIE R. BORCHELT, Primary Examiner

U.S. Cl. X.R.

350—148, 158